United States Patent Office
3,074,602
Patented Jan. 22, 1963

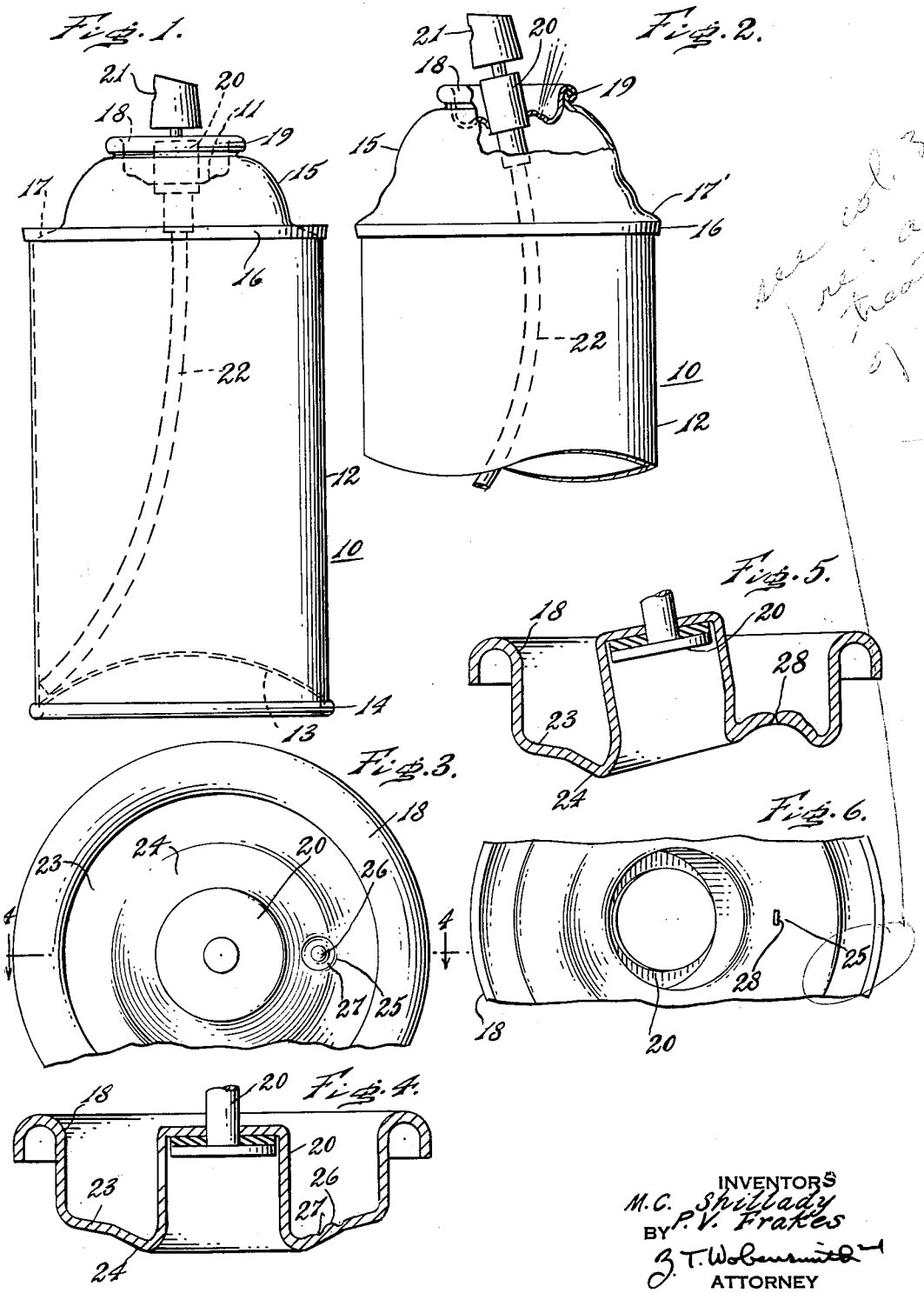

3,074,602
PRESSURE RELIEF DEVICES FOR PRESSURE VESSELS AND METHODS OF MAKING THE SAME
Marion Charlton Shillady, Norristown, and Paul V. Frakes, Philadelphia, Pa. (Both % M. C. Shillady, 662 Stanbridge St., Norristown, Pa.)
Filed Nov. 26, 1958, Ser. No. 776,553
4 Claims. (Cl. 222—397)

This invention relates to pressure relief devices for pressure vessels and methods of making the same.

It has heretofore been proposed to provide light weight sheet metal containers, portable in type, for the dispensing in aerosol form by means of an internal propellant various liquid materials and including paints, lacquers, deodorants, insecticides and other materials. The propellants commonly employed for this purpose are selected fluorinated hydrocarbons, liquid at subatmospheric temperatures and at pressures above atmospheric, and vaporizable upon pressure reduction and upon increase of temperature. Such fluorinated hydrocarbons are available under the name of Freon.

Other propellants are also employed, dependent upon the material to be dispensed, such propellants including nitrogen, carbon dioxide, nitrous oxide, argon, helium, propane and butane.

Such receptacles, with propellant therein, do not involve any hazard so long as the temperature thereof is maintained at normal atmospheric temperatures, but if such containers, whether in completely filled condition or in partly or substantially empty condition, are exposed to excessive heat, this tends to raise the pressure of the contents so that excessive pressures are generated in the interior of the container. Such excessive pressures can result, and have resulted, in explosions because of the lack of suitable provisions for pressure relief.

The likelihood of explosion can arise with discarded containers, incinerated with rubbish or subjected with rubbish to incinerator action, as well as upon subjection to unusual heating conditions including those found in the interiors of various storage spaces.

No wholly satisfactory provisions have heretofore been made for the relief of excess pressure generated within a portable metallic receptacle of the type aforesaid which can be applied to the receptacle at low cost, which is free from likelihood of failure, and which will attain the desired object of relieving the pressure within the vessel without any explosion occurring.

It is the principal object of the present invention to provide a simple but effective pressure relief device which is especially suited for use on portable sheet metal receptacles, and particularly those containing vaporizable propellants, which, when subjected to heating, generate pressures in excess of those which the receptacle is capable of withstanding.

It is a further object of the present invention to provide an excess pressure relief device of the character aforesaid which can be quickly, easily and inexpensively applied to convenient portions of pressure receptacles and which will be reliable in its operation.

It is a further object of the present invention to provide an excess pressure relief device for portable light weight sheet metal receptacles having as a characteristic thereof an area responsive to change of shape of a portion of the container under excess pressure for relief of the excess pressure to the atmosphere.

It is a further object of the present invention to provide a device for excess pressure relief of light weight sheet metal receptacles which includes a pressure sensitive portion capable of rupturing upon deformation due to excess pressure and which is integral with the receptacle wall.

It is a further object of the present invention to provide simple but effective processes for applying to light weight sheet metal containers excess pressure distortion responsive areas which are effective for pressure relief upon the attainment of a predetermined excess pressure level.

Other objects and advantageous features of the invention will be apparent from the description and claims.

The nature and characteristic features of the invention will be more readily understood from the following description, taken in connection with the accompanying drawings forming part thereof, in which:

FIGURE 1 is a vertical side elevational view of a container for which the excess pressure relief device in accordance with the invention is particularly suited, and having such device thereon;

FIG. 2 is a side view of the type of container illustrated in FIG. 1, partly in elevation and partly in vertical section, illustrating the pressure relief action;

FIG. 3 is a top plan view, enlarged, showing the application of the present invention to a cap for the container;

FIG. 4 is a vertical sectional view taken approximately on the line 4—4 of FIG. 3;

FIG. 5 is a view similar to FIG. 4 showing the pressure relief action attendant upon excess pressure deformation; and FIG. 6 is a top plan view of the structure shown in FIG. 5.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, and for purposes of illustration, a metallic receptacle 10 of conventional type is illustrated in FIG. 1 having the pressure relief device 11 of the present invention embodied therein. The pressure vessel 10, illustrated by way of example, is of a sixteen ounce size, although the invention is not restricted to this specific size or shape of container. The pressure vessel 10 of conventional construction includes a side wall 12 of sheet metal, an inwardly dished bottom wall 13 connected to the bottom of the side wall 12 by a fluid tight seam 14, and a head 15 connected to the top of the side wall 12 by a fluid tight seam 16. The head 15, inwardly and below the seam 16 has a downwardly disposed or depressed rim 17 to permit access of the seaming equipment required to apply the seam 16.

The head 15, at its upper portion, has a cap 18 connected thereto by a fluid tight seam 19. The cap 18 is provided with a manually operable dispensing valve 20 having a side discharge passageway 12, the valve 20 interiorly of the container 10 having a dipper tube 22 extending downwardly therefrom and into the space contiguous to the junction of the side wall 12 and the bottom wall 13.

A metallic container 10 of the type referred to is typically of a soft ductile deep draw low carbon steel of a type which does not exceed 1020 maximum, a steel of the type identified as 1010 being suitable. The bottom wall 13 and head 15 of such a container 10 may be of a thickness of the order of fifteen one-thousandths of an inch, and the cap 18 may be of a thickness of the order of eleven one-thousandths of an inch.

While the head 15 is shown as having a depressed rim 17, contiguous to the seam 16 and an upwardly extending curved portion within which the cap 18 extends, the present invention is applicable to other types of containers in which the head 15 and side wall 12 are made integral and uninterrupted.

A study of the explosion phenomena occurring with receptacles 10 of the type illustrated in FIG. 1, indicates that upon the attainment in the interior of an excess pressure of the order of 150 p.s.i. the head 15 tends to elongate longitudinally axially (see FIG. 2) so that the depressed rim 17 is raised upwardly from the concave position illustrated in FIG. 1 to the convex position illustrated at 17' in FIG. 2. The normal failure of receptacles of this type ordinarily occurs subsequent to the deformation of the head 15 by the bottom wall 13 changing from a concaved inward condition to a convexed outward position and with a separation of the bottom wall 13 from the side wall 12 at the seam 14. This separation can occur with violent action and reaction including propulsion of the container 10 as well as the bottom wall 13 in a manner which can seriously endanger life and limb.

In accordance with the present invention the pressure relief device, shown generally at 11, includes a pressure sensitive area in the form of a spot 25 applied to a portion of the container 10 which changes its shape upon being subjected to excess pressure; and while the rim portion 17 of the head 15 can be employed, it is preferred to utilize the cap 18 as the location for the application of the pressure sensitive area 25.

The cap 18 can have any desired cross section but preferably includes a portion which is changed in shape by excess pressure application thereagainst. A particularly suitable arrangement for this purpose consists in providing the cap 18 at the normally horizontal wall portion 23 thereof which is exposed to the pressure in the receptacle 10 with an inwardly concaved rim section 24 extending around the valve 20.

The inwardly concaved section 24 has the pressure sensitive area 25 applied thereto with the material at the pressure sensitive area 25 modified to change the normal characteristics thereof and preferably to provide an embrittlement or weakening at, or contiguous to, the location of maximum expected deformation of the rim section 24 from inwardly concaved to outwardly convexed position upon subjection to excess pressure.

While the pressure sensitive area 25 can be applied in any desired manner, it is preferred that this area 25 be made available on the container 10 without the necessity for complex structure, without requiring complicated holding devices, and without introducing undue or undesired change or deformation of the portion of the receptacle 10, such as the cap 18, at which it is applied.

It has been ascertained that the desired pressure sensitive area 25 can be quickly and easily applied to the cap 18 by the use of a tungsten inert gas shielded electric arc directed against the portion of the cap 18 and preferably the inwardly concaved section 24, in spaced relation thereto, with the portion of the container 10 to which the same is applied being connected to positive, the arc having a negative polarity.

While it might be possible to apply the pressure sensitive area 25 with the cap 18 seamed to the container 10, it is preferred to apply the pressure sensitive area 25 to the cap before it is assembled to the container 10.

In the application of the pressure sensitive area 25 by the tungsten inert gas shielded electric arc, while the time of application of the arc may be varied, it is preferred with sixty cycle alternating current to employ for application of the arc from one to ten cycles only in a time interval ranging from one sixtieth to one sixth of a second, three to six cycles being preferred. An excessive time application of the arc will cause a hole to be burned through the wall at which it is directed, and this is not desired.

The current input of the arc can be varied as desired over a range from about 15 to 65 amperes, but a current input of about 30 amperes appears to give optimum effects.

The application of the tungsten inert gas shielded electric arc, in spaced relation to the metallic wall, such as at the inwardly concaved section 24 of the cap 18, produces a gathering of metal at the central location 26 of application of the arc with the formation of a shallow groove 27 therearound, the groove 27 being close to or at a location on the selected part of the container 10, such as the concaved section 24 of the cap 18 where a maximum change of shape occurs upon the attainment of a predetermined excess pressure.

The application of the arc, as previously explained, provides a controllable reduction of cross section of the metal at the spot 25 so that when the concaved section 24 snaps from an inwardly concaved shape (see FIG. 4) to an outwardly convexed shape (see FIG. 5) a failure occurs, as indicated at 28, usually at the edge of the pressure sensitive area 25 to provide a venting orifice to permit the escape of pressure fluid from within the container 10 so that the pressure is reduced without explosion.

With conventional containers of the type shown at 10 the head 15 tends to elongate at about 150 p.s.i. internal pressure and separation of the bottom wall 13 from the side wall 12 normally occurs at about 250 p.s.i. internal pressure. The structure of the present invention has been found to be effective at pressure ranges between about 175 and 200 p.s.i.

It will thus be seen that there has been provided a simple but effective pressure relief device functioning upon the attainment of excess pressure to cause a deformation of a part of the container and thereby to effect a fracture in an integral portion of the container enclosing wall to relieve the internal excess pressure without explosion. The relief device located as specifically described is also effective for pressure relief without discharge of the remaining liquid contents of the receptacle.

We claim:
1. A device for the release of excess internal pressure of a pressure vessel containing vaporizing propellant comprising a closure cap for the receptacle having a dispensing valve with an integral inwardly concave portion therearound, said concave portion being movable to an outwardly convexed condition upon the attainment of excess internal pressure, said concave portion having an integral spot thereon of material of reduced cross section for rupture upon change of position of said concave portion to its outwardly convexed condition.

2. A device for the release of excess internal pressure of a receptacle comprising a closure cap for the receptacle having a dispensing valve with an integral inwardly concave internal pressure exposed portion therearound movable to an outwardly convexed condition upon the attainment of excess internal pressure, said portion having thereon an integral part with a shallow groove portion of reduced cross section surrounding a gathered portion of increased thickness for rupture upon change of shape of said concave portion to its outwardly convexed condition.

3. The method of providing an excess pressure release device for a metallic pressure receptacle which consists in directing against an inwardly concave wall portion of the receptacle a tungsten gas shielded electric arc for time period from one-sixtieth to one-sixth of a second and forming a spot with a groove of reduced cross section on the wall portion surrounding a gathered part of the metal.

4. The method of providing an excess pressure release device for a metallic pressure receptacle which consists in directing against an inwardly concave wall portion of the receptacle a tungsten gas shielded electric arc for a time period from one-sixtieth to one-sixth of a second with a current input in the range of fifteen to sixty-five amperes and forming a spot with a shallow groove of reduced cross section on the wall portion surrounding a gathered part of the metal.

References Cited in the file of this patent

UNITED STATES PATENTS

| | | |
|---|---|---|
| 2,303,359 | Mothersall | Dec. 1, 1942 |
| 2,424,794 | Brown | July 29, 1947 |
| 2,464,351 | Shorter | Mar. 15, 1949 |
| 2,640,792 | Binder | June 2, 1953 |
| 2,726,002 | Dalianis | Dec. 6, 1955 |
| 2,757,964 | Both et al. | Aug. 7, 1956 |
| 2,799,435 | Abplanalp | July 16, 1957 |